United States Patent Office 2,743,890
Patented May 1, 1956

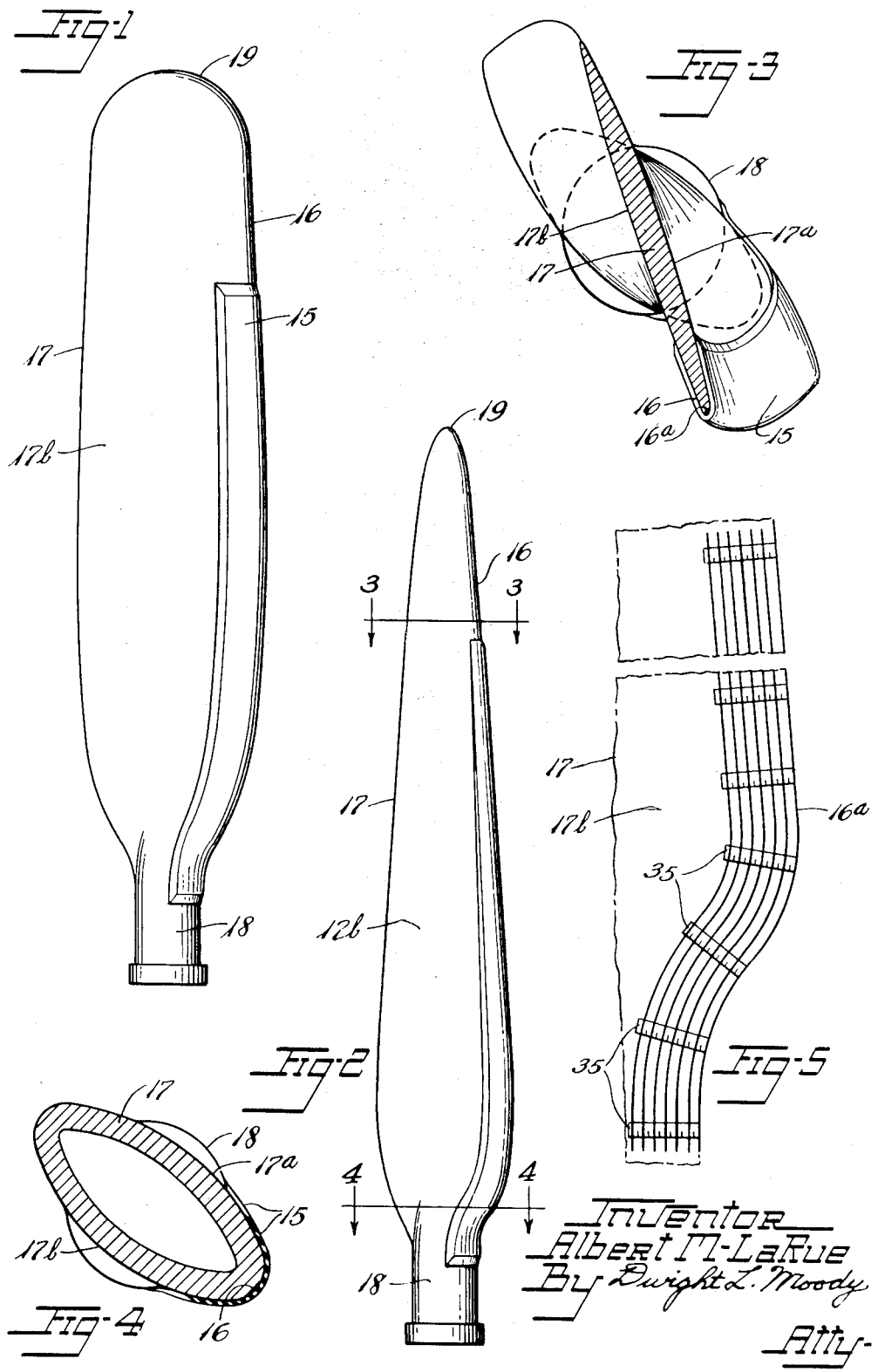

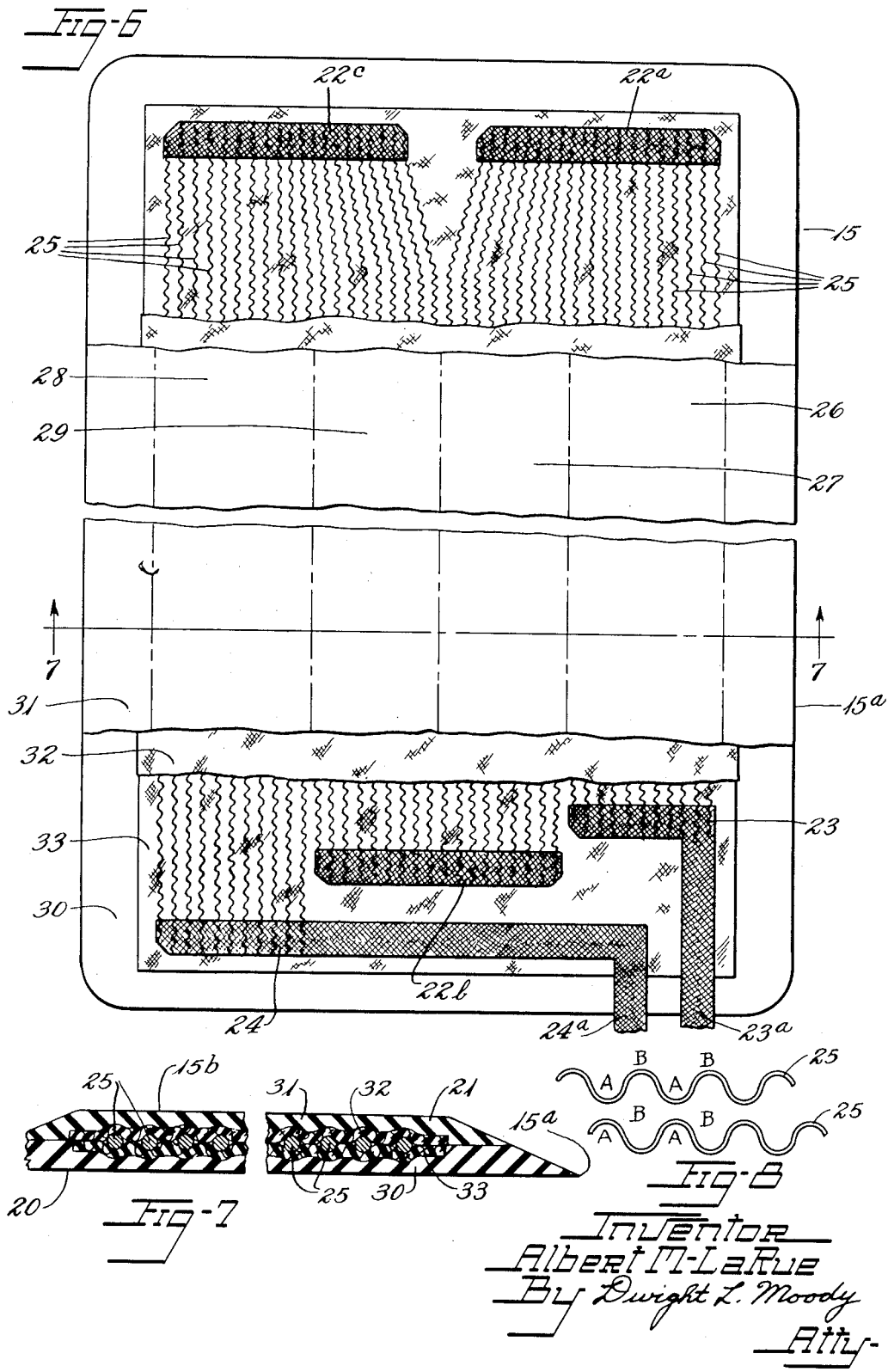

2,743,890

ELECTRICALLY HEATED PROTECTIVE COVERING FOR AIRCRAFT

Albert M. La Rue, Cuyahoga Falls, Ohio, assignor to The B. F. Goodrich Company, New York, N. Y., a corporation of New York Application July 31, 1952, Serial No. 301,923

8 Claims. (Cl. 244—134)

The invention relates to electrically heated protective coverings, and especially to such protective coverings adapted for mounting conformingly upon the leading edges of airfoils such, for example, as propeller blades, wings, control elements and other contoured elements of aircraft subject to flow of air under icing conditions.

Heretofore, electrically heated protective coverings or shoes having ordinary straight resistance heating wires in straight paths in a body of resilient rubber with or without ordinary stretch-resisting fabric reinforcement, have been used to prevent the accumulation of ice upon the leading edges of propeller blades, wings, and other exposed surfaces of aircraft. It has been customary practice to build the coverings in a flat form and with simple electrical circuits utilizing straight heating wires, because of convenience and low cost of manufacture. However, several difficulties have been experienced in producing the flat-built coverings and in conforming the same to curved surfaces especially at regions of compound curvature.

For example, the prior coverings or shoes of resilient rubber with straight heating wires and substantially inextensible or stretch-resisting fabric reinforcement embedded in the rubber, have presented the problem of buckling or wrinkling of the straight wires during vulcanization of the covering under heat and pressure. The vulcanizing process produces sufficient shrinkage of the rubber and the fabric reinforcement to cause the straight heating wires to wrinkle vertically and locally at one or more lateral zones along the covering and such wires even force their way through the rubber and fabric to the outer surface of the covering where they are exposed. Experience has shown that in a length of 40 in. of the covering, at least two zones of objectionably wrinkled wires may result from the vulcanization, which zones generally extend entirely across the covering. This produces a defective covering which must be scrapped at substantial loss to the producer.

When the flat-built vulcanized covering with straight heating wires therein is conformed to the leading edge of a propeller blade, for example, the wires tend to buckle objectionably or to stretch and break at regions of curvature, or twist, or both of the blade where it is necessary to either compress or to stretch locally the rubber covering. This is especially true at one or more regions of compound curvature and/or twist adjacent the shank where the configuration at one face of the blade requires compression and local shortening of the covering which results in wrinkling of the covering including the heating wires; and where the configuration at the opposite face of the blade requires stretching of the covering which tends to weaken and even break the heating wires. However, objectionable wrinkling or stretching of the covering is not limited to the shank of the blade, but because of the helical or twisted character of the propeller, may also occur at one or more regions closer to the tip of the blade.

The aforesaid difficulties can be attributed largely to the inability of the straight heating wires to stretch or compress or flex as required to conform to the curved or twisted surface without objectionable breaking or buckling, together with the inability of the covering as a whole to stretch or compress locally.

An object of the invention is to provide for overcoming the foregoing difficulties and disadvantages of the prior protective coverings while retaining the advantages of simplicity and economy of manufacture of the flat-built type construction.

Other objects of the invention are to provide an improved electrically heated protective covering for use on propeller blades, wings, antenna and pilot masts with flared bases, intake air scoops for jet or other engines, and for use on surfaces of compound curvature or other contoured configuration; to provide for building the improved protective covering in flat form, together with conforming the flat covering to a curved or twisted or helical surface without localized wrinkling of the covering; to provide for maintaining a smooth aerodynamic surface of the covering in the mounted condition; to provide for flexibility, stretchability and compressibility of the protective covering as a whole in all directions laterally and longitudinally of the covering; to provide for accommodating shrinkage of the material of the covering during vulcanization without objectionable buckling and exposure of the heating elements; and to provide for simplicity and thinness of construction, lightweight, convenience of manufacture and for effectiveness of heating and operation.

Further objects of the invention are to provide for disposing and maintaining crinkled heating wires in the covering at substantially uniform depth beneath the outer surface thereof and in a manner such that the turn portions or sinuosities of all the crinkled heating wires lie in a common surface, that is one lateral or transverse plane in the covering; to provide for maintaining the crinkled form of wire while accommodating flow and shrinkage of the rubber-like material under vulcanization of the covering; to provide for uniformity of bending or crinkling of the heating wires and for uniformity of flexure, stretchability and compressibility of the crinkled wires; to provide for close spacing of the crinkled heating wires with the turn portions thereof in random or in parallel relation to one another while avoiding interlocking, overlapping and contacting of the crinkled wires; to provide for change in spacing of the wires without change in the crinkling of the wires; to provide for substantially uniform high heat density throughout a unit heating area of the covering; to provide for avoiding localized objectionably high heat zones at closely adjacent turns of adjacent crinkled wires; and to provide for a series-parallel electrical arrangement of the crinkled heating wires and for a plurality of side-by-side heating areas in the covering.

These and other objects of the invention will be apparent from the following description.

In the accompanying drawings which form a part of this specification and in which like numerals are employed to designate like parts throughout the same, Fig. 1 is an elevational broadside view of an electrical heated protective covering upon the leading edge of a propeller blade, and constructed in accordance with and embodying the invention, Fig. 2 is a view like Fig. 1 but showing the covering as viewed facing toward the leading edge of the propeller blade, Fig. 3 is a cross-sectional view taken along line 3—3 of Fig. 2, showing the covering conformed to the helical twist and compound curvature of the leading edge of the blade, Fig. 4 is a cross-sectional view taken along line 4—4 of Fig. 2, showing the covering at a region of compound curvature adjacent the shank of the blade, Fig. 5 is a view showing a wire measuring arrangement with lines extending longitudinally parallel with the centerline of the leading edge of the blade and spaced laterally from the centerline at equal intervals to the sides thereof, broken lines indicating the bare blade with parts broken away, Fig. 6 is a plan view of the protective covering in a flat-built condition and before attachment to the propeller blade, parts being broken away, Fig. 7 is a cross-sectional view taken along line 7—7 of Fig. 6, parts being broken away, and Fig. 8 is a plan view in an enlarged scale showing a pair of the uniformly crinkled heating wires disposed in random turn relation one to the other and in a single plane as they are normally mounted in the covering, parts being broken away.

The electrical heating means or apparatus shown in the drawings comprises a flexible protective covering or shoe 15 having stretchable-compressible or crinkled heating elements 25, 25 therein and adapted for mounting on the curved leading edge 16 of a propeller blade 17 or other airfoil. The covering 15 may be of elongate form and may extend spanwise from the shank 18 of the blade to a desired position nearer the tip 19 of the blade, whereby the covering, by virtue of its crinkled heating elements 25, 25 prevents the accumulation of ice along the leading edge 16 including the shank region thereof.

The protective covering 15 is of thin, flexible, sheet-like construction and comprises a body 20 of elastic rubber-like dielectric material 21 with tapering in section margins for smooth conformance to the curvature of the leading edge 16. The elastic rubber-like dielectric material is natural or synthetic rubber, or other rubber-like material or synthetic material having substantially similar chemical composition or physical properties to natural rubber, and to equivalents therefor.

The protective covering includes flexible conductors 22 (a, b, c), 23, 24 which may be of stranded braided wire and flat strip form, imbedded in the elastic material 21 in insulated relation to one another and spaced-apart in a direction along a margin 15a of the covering or spanwise of the covering, and extending laterally or transversely of said direction or chordwise of the covering, preferably parallel to one another as shown in Fig. 6. The conductors are desirably made of suitable highly conductive material such as copper wire.

The protective covering has a plurality of stretchable-compressible resistance heating elements or wires 25, 25 of suitable resistance metal strip material imbedded in the elastic material 21 and extending in the direction along a margin 15a of the covering directly from one conductor to an opposite or other conductor and connected in parallel to the conductors. For the arrangement shown in the drawings, the heating wires 25, 25 extend spanwise along substantially parallel, closely spaced-apart, substantially straight paths or lines. Each heating wire is crinkled or crimped throughout its length. That is to say, in a given length or "reach" of a heating wire, there are a plurality of undulations in each inch of length of the reach. Thus the wires have a sinuous or serpentine disposition along one of the straight paths for horizontal and vertical flexure, and for localized stretching and compression or shortening in length of the crinkled heating wires along their paths, when the covering is conformed to the curvature of the leading edge 16 and the helical twist of the blade 17.

As shown in the drawings the crinkled heating wires 25, 25 are disposed in groups the individual wires of which are all connected electrically in parallel, and the connections between the groups provided by the flexible conductors 22 to 24, inclusive, place the groups in series electrically, that is, the crinkled heating wires 25, 25 are arranged in series-connected groups of wires individually in parallel. The ends of the crinkled heating wires are attached to the conductors as by soldering or brazing so that fused metal secures the wire ends to each of the conductors entirely across the width of the conductor to provide mechanical strength of the connection and good electrical, low-loss contact.

Each heating wire 25 may be of uniformly and closely crinkled or crimped construction, that is, the wire is formed in a series of short, substantially uniform bends or turns, or small regular undulations each of which can stretch and compress and flex. The crinkled arrangement makes feasible disposing each heating wire in a sinuous or serpentine path approaching a sine curve having a particular amplitude and frequency.

The heating wires 25, 25 may be made of a resistance metal alloy which may have, for example, one of the following compositions: 80% nickel-20% chromium; 45% nickel-55% copper; 22% nickel-78% copper; and 12% nickel-88% copper.

The size of heating wires of the desired composition may be selected as required to provide the desired heat dissipation for a unit heating area of the covering. A range of sizes suitable for the purpose of the invention, has been found to lie within the following standard Brown and Sharpe gauges and diameters:

| | Diameter in inches |
|---|---|
| 27 gauge | .0142 |
| 28 gauge | .0126 |
| 29 gauge | .0113 |
| 30 gauge | .010 |
| 31 gauge | .0089 |
| 32 gauge | .008 |

Each heating wire 25 may be a solid wire or have a stranded twisted wire construction.

Crinkling of the solid or the stranded twisted wire is preferably accomplished as by feeding a strand of straight wire between the engaging teeth of a pair of rotating spur gears (not shown), the teeth being shaped to provide undulations of the desired shape.

The preferred uniformly crinkled wire is shown in Fig. 8, and has a frequency of approximately 10 successive turns or interconnected undulations in each inch of length and a maximum amplitude within the range from about .045 in. to about .050 in.

Preferably, the crinkling of the wire is such as to produce uniform crinkling or sinuosities and at the same time, the interconnected undulations or sinuosities of the wire normally lie in a common surface (geometrically speaking), that is single plane laterally of the wire, whereby the crinkled wire, when disposed in the covering, lies in and conforms to the surface (geometrically speaking) of the covering, that is a single or one plane extending transversely or laterally in the covering as shown in Fig. 7, and substantially all portions of the undulations are equidistant from desirably the outer surface 15b as shown in Fig. 7, and no portion of the wire projects vertically toward the outer weather-exposed surface 15b of the covering.

The closely and uniformly crinkled wire may be disposed in the covering with the turns in random or non-parallel relation to one another as shown in Fig. 8, or if desired, with the turns in regular, parallel relation.

By virtue of the small amplitude (0.045" to 0.050") and the particular frequency of about 10 turns or looped reaches per running inch, the heating wires 25, 25 need not be interlocked nor overlap one another so as to restrict flexure and stretching of the wires, but, to the contrary, are spaced-apart and closely adjacent one another with intervening dielectric rubber-like material between closely adjacent portions (indicated by the letters AA) of the crinkled wires so as to facilitate flexure and individual stretching and compression of the wires. The arrangement avoids objectionable hot spots at the portions AA and objectionable cool spots at the relatively wider spaced portions indicated by the letters BB, and at the same time advantageously makes feasible substantially uniform and high density of heat dissipation per unit heating area of the covering. Although the heat immediately above the wire is normally greater than the heat to the sides of the wire, nevertheless the close uniform crinkling, that is small amplitude and high frequency, of the wires 25, 25 together with the closely spaced relationship of the wires produces substantially uniform heating throughout the unit heating area in the outer surface 15b which constitutes the heating face of the particular embodiment shown in the drawings.

Moreover, the closely crinkled wires 25, 25 are each individually and wholly surrounded by a mass of resilient rubber-like material 21 as shown in Fig. 7, and accordingly have local stretchability and compressibility, and can give and flex locally with the adjacent rubber-like material when the covering is flexed and conformed to the propeller blade 17 especially at its regions of compound curvature. Also, the closely crinkled wires, during vulcanization of the covering, can stretch or compress as required to accommodate flow of the rubber without tending to flex vertically and force their way to the outer surface 15b of the covering.

In this connection another important advantage of the crinkled heating wires is that they make feasible not only a substantially parallel, spaced-apart disposition of the flexible conductors with groups of wires of uniform length therebetween, as shown in Fig. 6, for facilitating simplicity, accuracy and convenience of manufacture of the covering, but also make feasible the maintenance of the parallel disposition of the conductors, when the covering is conformed to the curved leading edge of the blade, while accommodating variation in the lengths of the paths of the heating wires between the parallel conductors. This variation in lengths of the wire-paths is shown in Fig. 5, and is caused by differences in the cross-sectional profile laterally and longitudinally of the blade at its camber 17a and thrust 17b faces.

A covering having ordinary straight heating wires requires wires of varying lengths and an oppositely inclined disposition of the flexible conductors at the tip end of the covering, rather than a parallel disposition of all the conductors, in order to be conformed approximately to the blade without objectionable stretching and breakage of the heating wires. Even such a construction can not be conformed smoothly without some localized buckling of the covering and the heating wires because of the inability of the straight heating wires to extend and/or compress locally at regions of compound curvature and helical twist of the blade. In contrast, the provision of crinkled wires permits the desired parallel relationship of the flexible conductors and permits wires of uniform length in each group, as shown in Fig. 6, and at the same time, accommodates the variation in lengths of the wire-paths rearwardly of the leading edge centerline 16a and the compound curvature of the leading edge for smooth aerodynamic conformance of the covering to the blade.

For the particular form of covering 15 shown especially in Fig. 6 each heating zone 26, 27, 28, 29 has approximately the same width and substantially equal spacing of the crinkled wires. However, it is to be understood that the heating zones may be of different relative widths and that the spacing of the heating wires in the inner zones 27, 28, normally disposed at the immediate leading edge of the blade 17, may be closer than the spacing of the heating wires in the outer zones 26, 29, to provide greater heat density or heat dissipation at the immediate leading edge of the blade than at the rearward portions thereof. Variations in heat dissipation at the respective heating zones can also be obtained by changes in wire size and in wire alloy having suitable resistance characteristics.

For the arrangement shown in Fig. 6, the closely and uniformly crinkled heating wires 25 in the heating zone 26 are disposed spanwise along substantially straight, parallel, chordwise spaced-apart paths and are connected in parallel at one of their ends to one of the flexible conductors 23 in the shank end of the covering and at their other ends to one of the flexible conductors 22a in the tip end of the covering. From the conductor 22a the crinkled heating wires 25 in the heating zone 27 similarly extend toward the shank end of the covering to the intermediate flexible conductor 22b. In a similar manner the crinkled heating wires 25 in the heating zone 28 extend from the flexible conductor 22b to the other flexible conductor 22c in the tip end of the covering, and the crinkled heating wires 25 in the heating zone 29 extend from such flexible conductor 22c to the other flexible conductor 24 in the shank end of the covering. Thus, the heating wires 25, 25 are disposed in groups the individual wires of which are in parallel and the groups are in series. The conductors 23, 24 at the shank end of the covering may be provided with means or extensions 23a, 24a for connection to a suitable source of heating current (not shown).

In the preferred construction of the covering 15 the body 20 has an inner layer 30 of rubbery polymerized chloro-butadiene material known as neoprene, and a thin outer layer 31 of the neoprene material presenting the outer surface 15b or heating face subject to air under icing conditions. Between the inner and the outer layers 30 and 31, respectively, are a pair of superimposed reinforcing layers 32, 33 of stretchable sheet material. The reinforcing layers 32, 33 may be made of square-woven, bias-laid fabric sheet material of glass, or nylon, or rayon, or cotton, or other suitable filamentary material coated or impregnated desirably on both sides with a neoprene composition. Stockinette, Tricot or other knitted or otherwise stretchable fabric may be used instead of the square-woven, bias-laid textile fabric. In any event, the bias-laid textile fabric, or the Stockinette, or the Tricot fabric is desirably stretchable both laterally and longitudinally of the covering.

The resistance heating structure comprising the flexible conductors 22 to 24, inclusive, and the closely and uniformly crinkled heating wires 25, 25 is disposed between the superimposed reinforcing layers 32, 33, the conductors and wires being adhesively attached to both layers 32, 33 as by a suitable liquid neoprene cement. The neoprene coating on the reinforcing layers together with the neoprene cement provide a thin continuous layer of resilient dielectric rubber-like material wholly surrounding each of the heating wires as shown especially in Fig. 7, for insulating purposes and for facilitating stretching and compression and flexure of the individual heating wires 25.

During vulcanization of the flat-built covering 15, the stretchable fabric reinforcing layers 32, 33 and the stretchable-compressible heating wires 25, 25 mutually coact to accommodate shrinkage of the neoprene and the fabric without objectionable local wrinkling of the covering and objectionable vertical buckling or other displacement of the heating wires. Also, such coaction of the elements of the covering prevents breakage and buckling of the heating wires during vulcanization, and eliminates effectively exposed heating wires at the outer surface 15b of the covering.

When the vulcanized covering 15 in its flat-built condition is to be mounted on the curved leading edge of a propeller blade, the stretchable reinforcing layers 32 and 33 and the stretchable-compressible heating wires mutually coact with the neoprene layers 30, 31 to provide for local stretching of the body 20 including the heating wires and the reinforcing layers, where required, and local compression or shortening of the body 20 including the heating wires and the reinforcing layers, where required, to facilitate all-over smooth conformance of the covering to the blade. For example, the compound curvature and twist of the blade shown especially in Figs. 2, 3 and 4, are such that normally at one face 17b of the blade the heating wires 25, 25 and the reinforcing layers 32, 33 and the neoprene material 21, 30, 31 must be stretched locally to conform the covering smoothly to the blade; whereas normally at the other face 17a of the blade some compression of such elements must be effected locally to provide the desired smooth conformance. The stretchability and compressibility of the protective covering 15 as a whole makes feasible a smooth aerodynamic fitting of the flat-built covering to the curved leading edge without the formation of objectionable wrinkles and without breakage of the heating wires, while maintaining effective heating of the covering without localized hot or cold spots.

The term "anti-icing" as used in the following claims is defined as including the heating effect produced at the heating face of the covering when the electrical heating current is supplied either continuously or intermittently to all or part of the resistance heating wires in the covering.

Variations may be made without departing from the scope of the invention as it is defined in the following claims.

I claim:

1. An electrically heated thin flexible anti-icing covering comprising a body of elastic rubber-like material, an inner face on the covering adapted for attachment to a structure at a surface thereof, an outer face on said covering spaced from said inner face, one of said faces constituting a heating face of the covering, electrical heating means including a plurality of electrically interconnected reaches of electrical resistance heating wire imbedded in said body, and means for connecting said reaches of heating wire to a source of electrical heating current, said reaches of heating wire being disposed in insulated closely spaced-apart relationship and each of said reaches of heating wire being crinkled along its length providing a plurality of interconnected undulations in each inch of length of the reach, all the undulations in said reaches of heating wire having substantially all portions therein equidistant from said heating face of the covering, and said rubber-like material in said body elastically maintaining all said undulations in their undulated configuration and in their equidistant relation to said heating face so that said undulations are locally and individually extensible and contractible with said covering.

2. An electrically heated thin flexible anti-icing covering comprising a body of elastic rubber-like material, an inner face on the covering adapted for attachment to a structure at a surface thereof, an outer face on said covering spaced from said inner face, one of said faces constituting a heating face of the covering, electrical heating means including at least a pair of electrical resistance heating wires imbedded in said body, means for connecting said heating wires to a source of electrical heating current, said heating wires being disposed in closely spaced-apart relationship and each of said heating wires being crinkled along its length providing a plurality of interconnected undulations in each inch of length of the heating wire, all the undulations in said heating wires having substantially all portions therein disposed in a common plane intermediate said inner and outer faces of said body which common plane is equidistant from said heating face of the covering, and said body including a thin continuous layer of elastic rubber-like dielectric material directly contacting all said heating wires and insulating each heating wire from an adjacent heating wire throughout their respective lengths, said layer elastically maintaining all said undulations in their undulated configuration and in said common plane so that said undulations are locally and individually extensible and contractible together with said layer of said dielectric material.

3. An electrically heated thin flexible anti-icing covering comprising a sheet-like body of elastic rubber-like material, an inner face of the covering adapted for attachment to a structure at a surface thereof, an outer face on the covering spaced from said inner face, one of said faces constituting a heating face of the covering, electrical heating means including a plurality of electrical resistance heating wires imbedded in said body, flexible conductor means for connecting said heating wires to a source of electrical heating current, said heating wires being disposed in closely spaced-apart relationship and along substantially parallel paths in the body, each of said heating wires being crinkled along its length providing a plurality of interconnected undulations in each inch of length of the heating wire, all the undulations in said heating wires having substantially all portions therein equidistant from said heating face, and said body including a thin continuous layer of elastic rubber-like dielectric material directly contacting and entirely surrounding all the heating wires and insulating each heating wire from an adjacent heating wire throughout their respective lengths, said layer elastically maintaining all said undulations in their undulated configuration and in their equidistant relation to said heating face so that said undulations are locally and individually extensible and contractible together with said layer of said dielectric material, and a stretchable reinforcing fabric sheet overlying all said heating wires and being disposed intermediate said layer of dielectric material and said heating face.

4. An electrically heated thin flexible anti-icing covering for the leading edge of an airfoil, said covering comprising a sheet-like body of resilient rubber-like material having spaced-apart margins, an inner face on the covering adapted for attachment to the said leading edge, an outer heating face on the covering spaced from said inner face, electrical heating means including a plurality of electrical resistance heating wires imbedded in said body in closely spaced-apart relationship and extending in the direction along one of said margins, spaced-apart flexible electrical conductors imbedded in said body and connected to the respective ends of said heating wires for conducting electrical heating current to and from said heating wires, each of said heating wires being crinkled along its length providing a plurality of interconnected undulations in each inch of length of the heating wire, all the undulations in said heating wires having substantially all portions therein equidistant from said outer heating face, and said body including a thin continuous layer of elastic rubber-like dielectric material directly contacting and entirely surrounding all the heating wires and insulating each heating wire from an adjacent heating wire throughout their respective lengths, said layer elastically maintaining all said undulations in their undulated configuration and in their equidistant relation to said outer heating face so that said undulations are locally and individually extensible and contractible together with said layer of dielectric material.

5. A covering as defined in claim 4 in which all said interconnected undulations of the heating wires have a frequency in the order of about ten substantially uniform generally sinuous undulations in each inch of length of the heating wire with a miximum amplitude in the order of about 0.045 inch to about 0.050 inch.

6. An electrically heated thin flexible anti-icing covering for the leading edge of an airfoil, the covering comprising a sheet-like body of resilient rubber-like material having spaced-apart margins and including uniformly spaced-apart inner and outer layers of said rubber-like material, said inner layer providing an inner face on the covering adapted for attachment to said leading edge and said outer layer providing an outer heating face on the covering, superimposed reinforcing sheets of highly stretchable fabric disposed spaced-apart between said inner and outer layers of said body, a plurality of electrical resistance heating wires disposed between the fabric reinforcing sheets in closely spaced-apart relationship and extending in the direction along one of said margins, electrical conductors between said fabric reinforcing sheets and connected to the respective ends of said heating wires for conducting electrical heating current to and from said heating wires, each of said heating wires being crinkled along its length providing a plurality of interconnected undulations in each inch of length of the heating wire, all the undulations in said heating wires having substantially all portions therein equidistant from said outer heating face, and a thin continuous layer of elastic rubber-like dielectric material disposed between said fabric reinforcing sheets and directly contacting and entirely surrounding all said heating wires and insulating each heating wire from an adjacent heating wire throughout their respective lengths, the rubber-like inner and outer layers and said fabric reinforcing sheets and said dielectric layer being integrally united by vulcanization, and said dielectric layer resiliently maintaining all said undulations in their undulated configuration and in their equidistant relation to said outer heating face so that said undulations are locally and individually extensible and contractible with said covering.

7. An electrically heated anti-icing propeller blade shoe having an elongated sheet-like shape and comprising a body of elastic rubber-like material, an inner face on said shoe adapted for attachment to the leading edge of a propeller blade, an outer face on the shoe spaced from said inner face, one of said faces constituting a heating face of said shoe, electrical heating means including a plurality of electrical resistance heating wires imbedded in said body of rubber-like material and extending lengthwise of the shoe in insulated closely spaced-apart relationship and along substantially parallel paths between opposite ends of the shoe, flexible electrical conductors connected to the respective ends of said heating wires for conducting electrical heating current to and from the heating wires, said conductors being arranged for disposition at the region of the shank of the propeller blade and at the region of the tip of the propeller blade, each of said heating wires being crinkled along its length providing a plurality of interconnected undulations in each inch of length of the heating wire, all the undulations in said heating wires having substantially all portions therein equidistant from said heating face of the shoe, said body of rubber-like material elastically maintaining all said undulations in their undulated configuration and in their equidistant relation to said heating face so that said undulations are locally and individually extensible and contractible with said shoe.

8. An electrically heated anti-icing propeller blade shoe having an elongated sheet-like shape and comprising a body of elastic rubber-like material, an inner face on said shoe adapted for attachment to the leading edge of a propeller blade, an outer heating face on the shoe uniformly spaced from said inner face, electrical heating means including a plurality of electrical resistance heating wires imbedded in said body of rubber-like material in closely spaced-apart relationship and extending lengthwise of the shoe along substantially parallel paths between opposite ends of the shoe, laterally spaced-apart laterally-extending flexible electrical conductors imbedded in said rubber-like material and connected to the ends of said heating wires at the region of each of said ends of the shoe for conducting electrical heating current to and from the heating wires, each of said heating wires being crinkled along its length providing a plurality of interconnected undulations having a frequency in the order of about ten substantially uniform sinuous undulations in each inch of length of the heating wire and a maximum amplitude in the order of about 0.045 inch to about 0.050 inch, all the undulations in said heating wires having substantially all portions therein equidistant from said outer heating face of the shoe, said heating wires being arranged in groups the individual wires of which are connected electrically in parallel and said conductors extending between and connecting the groups such as to place them in series electrically, and said body of the shoe including a thin continuous layer of elastic rubber-like dielectric material directly contacting and entirely surrounding all the heating wires and insulating each heating wire from an adjacent heating wire throughout their respective lengths, said layer elastically maintaining all said undulations in their undulated configuration and in their equidistant relation to said outer heating face so that said undulations are locally and individually extensible and contractible together with said layer, a reinforcing sheet of highly stretchable textile fabric material overlying all said heating wires and united with said layer of dielectric material, and a second reinforcing sheet of highly stretchable textile fabric material underlying all said heating wires and united with said layer of dielectric material, both said reinforcing sheets being united with said rubber-like material of said shoe.

References Cited in the file of this patent

UNITED STATES PATENTS

| | | |
|---|---|---|
| 1,032,267 | Bastian | July 9, 1912 |
| 1,362,351 | Rankin | Dec. 14, 1920 |
| 1,965,542 | Colvin | July 3, 1934 |
| 2,406,367 | Griffith et al. | Aug. 27, 1946 |
| 2,464,147 | Myers | Mar. 8, 1949 |
| 2,496,279 | Ely et al. | Feb. 7, 1950 |
| 2,550,836 | MacHenry | May 1, 1951 |
| 2,564,325 | Coonly | Aug. 14, 1951 |
| 2,568,669 | Totheroh | Sept. 18, 1951 |

FOREIGN PATENTS

| | | |
|---|---|---|
| 853,799 | France | Dec. 16, 1939 |